United States Patent
Aymard et al.

[11] Patent Number: 6,066,413
[45] Date of Patent: May 23, 2000

[54] METHOD FOR INCREASING REVERSIBLE LITHIUM INTERCALATION CAPACITY IN CARBON ELECTRODE SECONDARY BATTERIES

[75] Inventors: Luc Aymard; Florence Disma, both of Amiens, France; Jean-Marie Tarascon, Martinsville, N.J.

[73] Assignee: Telcordia Technologies, Inc., Morristown, N.J.

[21] Appl. No.: 08/811,813

[22] Filed: Mar. 6, 1997

[51] Int. Cl.[7] ................................................. H01M 4/38
[52] U.S. Cl. .................. 429/217; 429/231.8; 423/460
[58] Field of Search ........................... 429/218, 217, 429/231.8; 423/460

[56] References Cited

U.S. PATENT DOCUMENTS

| | | | |
|---|---|---|---|
| 5,162,170 | 11/1992 | Miyabayashi et al. | 429/94 |
| 5,219,680 | 6/1993 | Fauteux | 429/192 |
| 5,378,561 | 1/1995 | Furukawa et al. | 429/218 |
| 5,460,904 | 10/1995 | Gozdz et al. | 429/192 |
| 5,622,793 | 4/1997 | Iijima et al. | 429/218 |

FOREIGN PATENT DOCUMENTS 460617  4/1991  European Pat. Off. .

OTHER PUBLICATIONS

J. R. Dahn et al., *Lithium Batteries—New Materials, Developments and Perspectives*, edited by G. Pistoia (Elsevier North Holland) Chapter 1, pp. 1–47 (1993) (month n/a).

*Primary Examiner*—Stephen Kalafut
*Attorney, Agent, or Firm*—David A. Hey

[57] ABSTRACT

Mechanical grinding of graphite, soft carbon coke, or hard carbon over the range of 20–80 hours produces carbon powders which may be incorporated into secondary lithium battery electrodes to yield improved reversible lithium intercalation capacity of up to about 708 mAh/g, thus approximating $Li_2C_6$, with irreversible intercalation of only about 328 mAh/g.

10 Claims, 9 Drawing Sheets

METHOD FOR INCREASING REVERSIBLE LITHIUM INTERCALATION CAPACITY IN CARBON ELECTRODE SECONDARY BATTERIES

BACKGROUND OF THE INVENTION

In the intense search for high capacity anode materials for use in lithium-ion rechargeable battery technology, researchers have focused their efforts on the study of various carbonaceous materials. Graphite, because of its ability to rapidly and reversibly intercalate one lithium per six carbons (yielding a charge capacity of 372 mAh/g) at a voltage <0.5V vs. Li, is presently used as the anode material in Li-ion batteries. Nevertheless, an irreversible discharge plateau near 0.8 V, ascribed to electrolyte decomposition, appears during the first discharge of C/Li cells and its magnitude, i.e., irreversible capacity, is a function of both the nature of the graphitic carbon as well as of the electrolyte used.

Recently, there have been numerous reports on various types of carbonaceous battery electrode materials, including the so-called disordered hard carbons which display capacities up to twice greater than that of graphite, with however a large irreversible loss (>20%) between the first discharge and the first charge. Despite such a large loss, for several reasons (better cycle life, less bulging, less risk of Li plating and easier cell balancing), this type of carbon is useful, as well as graphite, for use in commercial Li-ion cells. A comprehensive review of the structure and utility in electrolytic cells of a broad range of investigated carbon materials, from natural "perfect" graphite to coke and soft and hard carbons specifically synthesized for the purpose, as by pyrolysis of selected organic precursor compounds, has been published by J. R. Dahn et al. in *Lithium Batteries— New Materials, Developments and Perspective*, edited by G. Pistoia (Elsevier North Holland) Chapter 1, pp. 1–47 (1993).

The irreversible cell capacity loss is believed to be mainly due to electrolyte decomposition that results in the formation of a passivating film or Solid Electrolyte Interphase (SEI) on the carbon surface. Numerous studies have examined the chemical composition and formation of SEI, and new electrolyte compositions leading to only about 7% irreversible losses in some types of graphite have been found. However, with the same electrolytes other graphitic carbons have shown losses as high as 25%. The fact that these various carbon materials differ in such properties as morphology, specific surface area, and defects density makes any systematic study of SEI formation difficult. Due to such limitations, the role played by carbon material surface states in SEI formation and resulting irreversible capacity loss has been unclear.

The discoveries underlying the present invention have arisen from extensive investigations by the inventors into the comminuting, or pulverizing, of carbon materials by mechanical grinding and the effect of such size-reduction operations on crystallite size, morphology, specific surface area, and electrochemical performance of the resulting carbon materials when used in electrodes of Li-ion/carbon electrolytic battery cells. As a result of the comminuting treatment of the present invention, a wide range of carbonaceous precursors of differing properties and morphology may be employed to consistently obtain carbon electrode materials which are capable of reversibly intercalating about two lithiums per six carbons, i.e., $Li_2C_6$, to yield reversible capacity of 708 mAh/g while having irreversible capacity of only about 328 mAh/g.

SUMMARY OF THE INVENTION

Representative samples of commercial-grade carbons varying by type, i.e., graphite (F399), soft carbon coke (CONOCO microbeads—MCMB 2510), and hard carbon (SP carbon black), and by initial morphology within a type, i.e., graphites of hexagonal, or 2H, sheet (F399), microbead (MCMB 2528), and fiber (AM) forms were comminuted by mechanical grinding using two types of apparatus. In addition, The first, a commercially-available mixer/mill (SPEX 8000—SPEX Industries, Edison, N.J., USA), generated impact shock interactions as the result of the steel ball grinding elements striking the walls of the grinding container, while the second, a commercial planetary mill (FRITSCH P7—Fritsch GmbH, Idar-Oberstein, Germany) generated a predominantly shearing interactions as the result of the rolling of the steel ball elements on the wall of the grinding container. In short, the SPEX generates mainly a perpendicular mechanical strain while the FRITSCH generates a tangential mechanical strain. In both cases the weight ratio of steel ball to carbon sample was about 8:1.

The structural changes in the ground powders were tracked by X-ray diffraction measurements using a Philips diffractometer PW1710 with Cu K$\alpha$ radiations (0.15418 nm). A numerical method included in the Diffrac-At software was used to analyze the XRD patterns and to obtain the position and the full width at half height (FWHH) of the diffraction peaks. A decomposition of the Bragg peaks based on the Voigt peak shapes was chosen. The knowledge of both the position and the full width at half height of the diffraction peaks allows the identification of the solid phases and their division states, respectively, as a function of the grinding time. The crystallite size has been obtained using the Williamson and Hall formula and the powder morphology as a function of grinding time was studied by scanning electron microscopy with a Philips SEM model 505. Single-point BET surface area measurements were made using a Micromeritics Gemini II 2370 surface area analyzer.

At various stages in the grinding or milling of the carbon materials samples were collected and employed in the preparation of positive electrodes for electrolytic test cells. These cells were tested in discharge/charge cycling to determine the degree of reversible and irreversible lithium intercalation into the carbon electrode materials. Comparisons of the reversible capacity ($\Delta x_{rev}$) and irreversible capacity ($\Delta x_{irrev}$) of the test cells with measured BET surface area and $d_{002}$ Bragg peak layer lattice spacing surprisingly revealed different results attributable to the respective comminuting operations, while those properties differed little among samples of dissimilar type or morphology processed by a given grinding system. It was thus discovered to the economic advantage of battery manufacture that optimum performance of carbon electrode materials is not dependent upon the highly specific selection or synthesis processing of precursor materials, but can be derived through the simple expedient of grinding any such precursors in readily-available comminuting systems.

It was found, for example, that while BET surface areas increased, as would be expected, in the early defoliating stages of grinding graphite in either impact or shear equipment, extended grinding by impact apparently fractures the carbon particulates to allow expansion in the $d_{002}$ lattice parameter from about 0.335 nm to 0.357 nm with resulting increase in the ability of the material to intercalate lithium ions upon recharging, i.e., improved capacity. The concomitant agglomeration of fractured particles was observed, however, to provide the additional advantage of reducing BET surface area with resulting reduction in exposure to electrolyte to yield less irreversible capacity. Impact pulverization of an exemplary graphite sample over the period of about 80 hours thus provided a material of about 150 m$^2$/g BET surface area and 0.357 nm $d_{002}$ lattice parameter which when tested in an electrolytic cell exhibited performance commercially superior to that of a highly specialized carbon electrode material synthesized through pyrolysis of siloxane polymer. Whereas the latter material has been reported to yield cells with capacities of $\Delta x_{rev}$=660 mAh/g (corresponding to $Li_{1.77}C_6$) and $\Delta x_{irrev}$=340 mAh/g ($Li_{0.91}C_6$), the sample material of the present invention provided capacities of $\Delta x_{rev}$=655 mAh/g (corresponding to $Li_{1.76}C_6$) and $\Delta x_{irrev}$=316 mAh/g ($Li_{0.85}C_6$)

BRIEF DESCRIPTION OF THE DRAWING

The present invention will be described with reference to the accompanying drawing of which.

DESCRIPTION OF THE INVENTION

Samples of three commercial graphites with different morphologies, sheet form (F399), microbead form (MCMB 2528), and fiber form (AM), were mechanically comminuted by grinding, or pulverizing, in two different types of grinding systems. The first system (SPEX 8000) generated predominantly perpendicular forces on the graphite samples due to the impact interactions of the steel ball grinding elements upon the apparatus walls. The second, a planetary mill (FRITSCH P7), applied tangential forces to the samples, resulting in shearing interactions. In addition to the effect of variations in initial graphite sample morphology, the impact grinding effect upon different types of carbons of the same initial microbead shape, i.e., graphite (MCMB 2528), soft carbon coke (MCMB 2510), and hard carbon (SP carbon black), was also examined.

During the course of the grinding operations, samples of the carbons were examined by X-ray diffraction analysis. In the case of the well-graphitized F399 sheet graphite having stacked hexagonal "2H" form with little stacking disorder, for example, the stacking of the layers was observed in the sharp and well-defined (002) and (004) diffraction peaks indicative of high crystallinity. With an increase in grinding time and independently of the grinding apparatus used, it was observed that a decrease in intensity as well as a broadening of the (002) carbon peak occurred.

Figure 1:
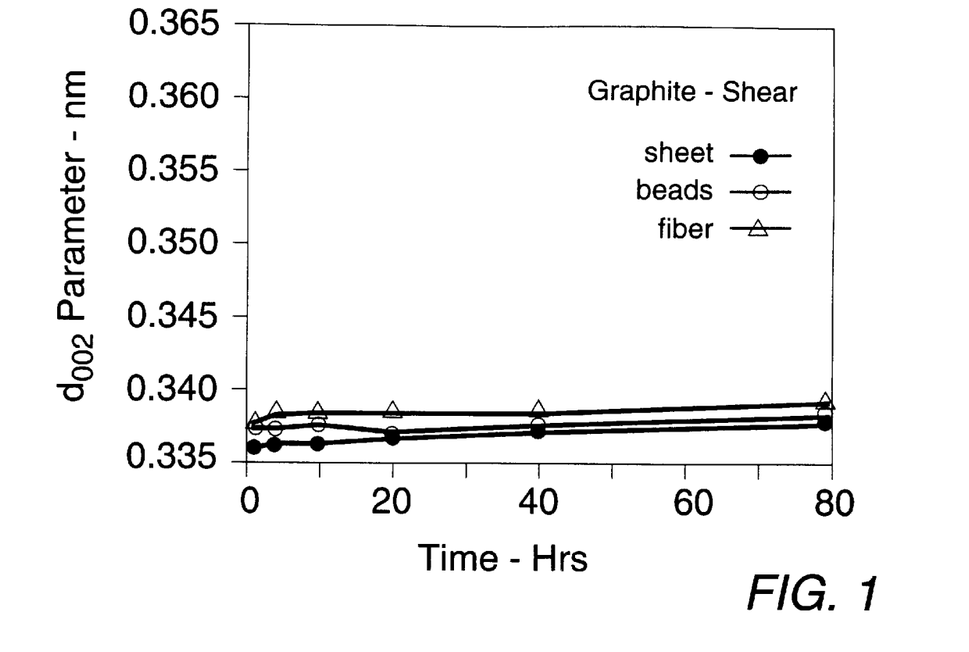
FIG. 1 is a graphic comparison of the $d_{002}$ lattice parameter measurements of graphites of initial sheet, bead, and fiber morphology after grinding under shear interactions over a period of about 80 hours.
Figure 2:
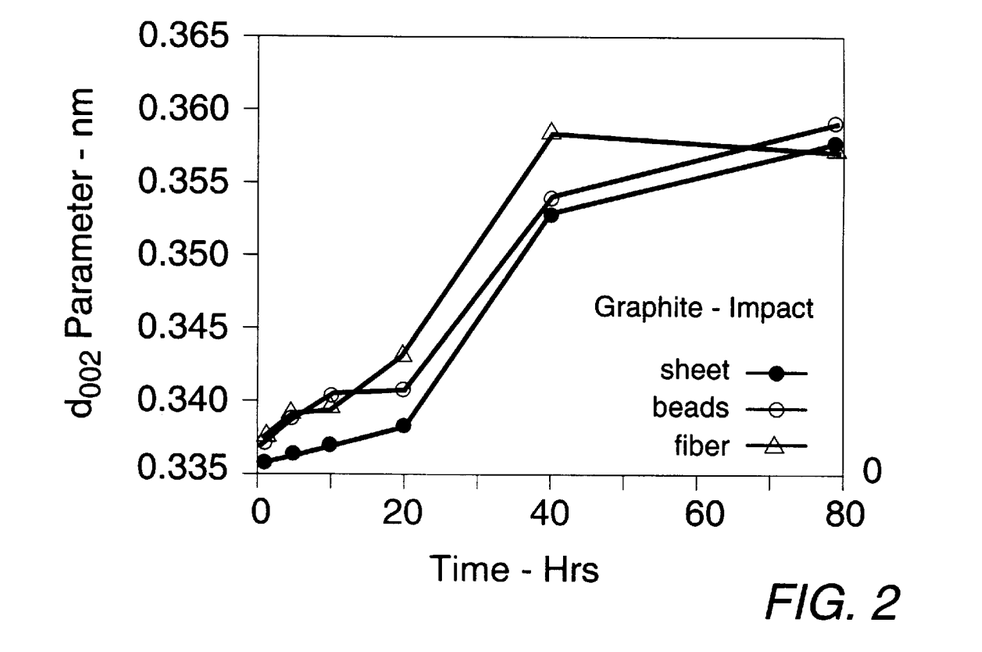
FIG. 2 is a graphic comparison of the $d_{002}$ lattice parameter measurements of graphites of initial sheet, bead, and fiber morphology after grinding under impact interactions over a period of about 80 hours.

This decrease in intensity, indicating the appearance of turbostratic disorder occurs more rapidly when grinding is effected by impact rather than by shear interactions. The influence of the grinding conditions upon the graphite interlayer spacing is illustrated in FIGS. 1 and 2. There it will be noted that the interlayer ($d_{002}$) distance increases significantly, e.g., from about 0.335 nm for raw graphite to about 0.352 nm for graphite powders ground 80 hours with impact, while only increasing to about 0.337 nm over the same period due to shearing effects. The width of the (002) peak was demonstrated to be a good indicator of the proportion of unorganized carbon in the carbonaceous materials. The effect of impact grinding on the initially more disorganized carbon structures of coke and SP carbon black is similarly seen in FIG. 3.

The ground graphite sample powders produced by the shear and impact interactions were also examined by scanning electron microscope (SEM) where it was noted that a change in the morphology of the powders depends on the type of grinder used. For example, with the powders ground under shear interactions, particles gradually decreased in size until agglomeration occurred after about 20 hours grinding time, resulting in laminar particles or disks of diameters ranging from about 20 μm to 50 μm and of about 10 μm thickness. In contrast, the powders prepared using the impact system were quickly reduced in size with agglomeration beginning within about 5 hours grinding time, yielding a particle size of 100 μm to 200 μm which reached a constant size of about 50 μm at 80 hours. Shear interactions thus apparently favor the exfoliation of the graphite layers first, without breaking these layers, i.e., without introducing internal strain, while shock interactions favor the breaking of the layers first, the end results leading to powders of similar surface area, but with different morphology.

The powder samples obtained from the grinding operations were additionally examined with a Micromeritics Gemini II 2370 surface area analyzer which utilizes a flowing gas technique wherein the adsorption of nitrogen furnishes a measure of specific surface BET area of a sample. This testing procedure provided a view of the powder morphology which is more relevant than simple particle size to the presumed causes of irreversible capacity occurring in the initial stages of electrolytic charge cycling.

Such capacity loss is believed to result from a reaction in which, upon the initial discharge of a C/Li cell and concurrent Li intercalation, the first Li ions that reach the carbon electrode react with the electrolyte solvent resulting in the decomposition of the electrolyte and in the formation of a passivating film, the so-called solid polymer electrolyte (SPE). This reaction continues until the thickness of the passivating film is large enough to prevent electron tunneling. Therefore, increases in the surface of a carbon electrode should yield more area to be passivated and, as a result, should require the irreversible consumption of more lithium ions, leading in turn to greater irreversible loss of cell capacity. Conversely, it was anticipated that a reduction in specific surface BET area occasioned by the formation of particle agglomeration, due apparently to the inability of the larger nitrogen molecules to penetrate the agglomerates, would signal a similar inability of the large electrolyte solvent molecules to reach reaction surfaces otherwise accessible to the smaller intercalating lithium ions and, thus, indicate a condition promoting reversible capacity over irreversible loss of capacity.

Samples of the ground carbons taken at various times during the grinding operations were used to prepare positive electrodes for electrolytic test cells. These electrodes were prepared using dry plastic laminate technology as described, for example, in U.S. Pat. No. 5,460,904, which comprised dispersing about 7 g of ground carbon sample in a mixture of about 2 g of PVdF binder polymer (Aldrich) and about 3 g of dibutyl phthalate (DBP—Aldrich) dissolved in about 12 g of acetone. About 5% by weight of super P carbon black (SP) was added in the usual manner to enhance electrical conductivity of the final electrode composition. The resulting paste was coated on a glass support disk and the DBP was extracted with diethyl ether. A lithium metal foil paste coated on a stainless steel disk was used as the negative electrode. The positive and negative electrodes were electronically separated by one layer of Wachtman GF/D borosilicate glass fiber paper soaked in an electrolyte comprising a 1M solution of $LiPF_6$ in a 2:1 mixture of ethylene carbonate and dimethyl carbonate. The cell components were then assembled in a Swagelok laboratory test cell and tested between 3 V and 0 V at a constant C/10 current vs. the nominal $LiC_6$ composition. Although, for convenience in testing, simple lithium metal negative electrode cell structures were utilized, the carbon electrode materials may preferably be incorporated into lithium-ion cells where they would serve as the active components of the negative electrode.

Figure 13:
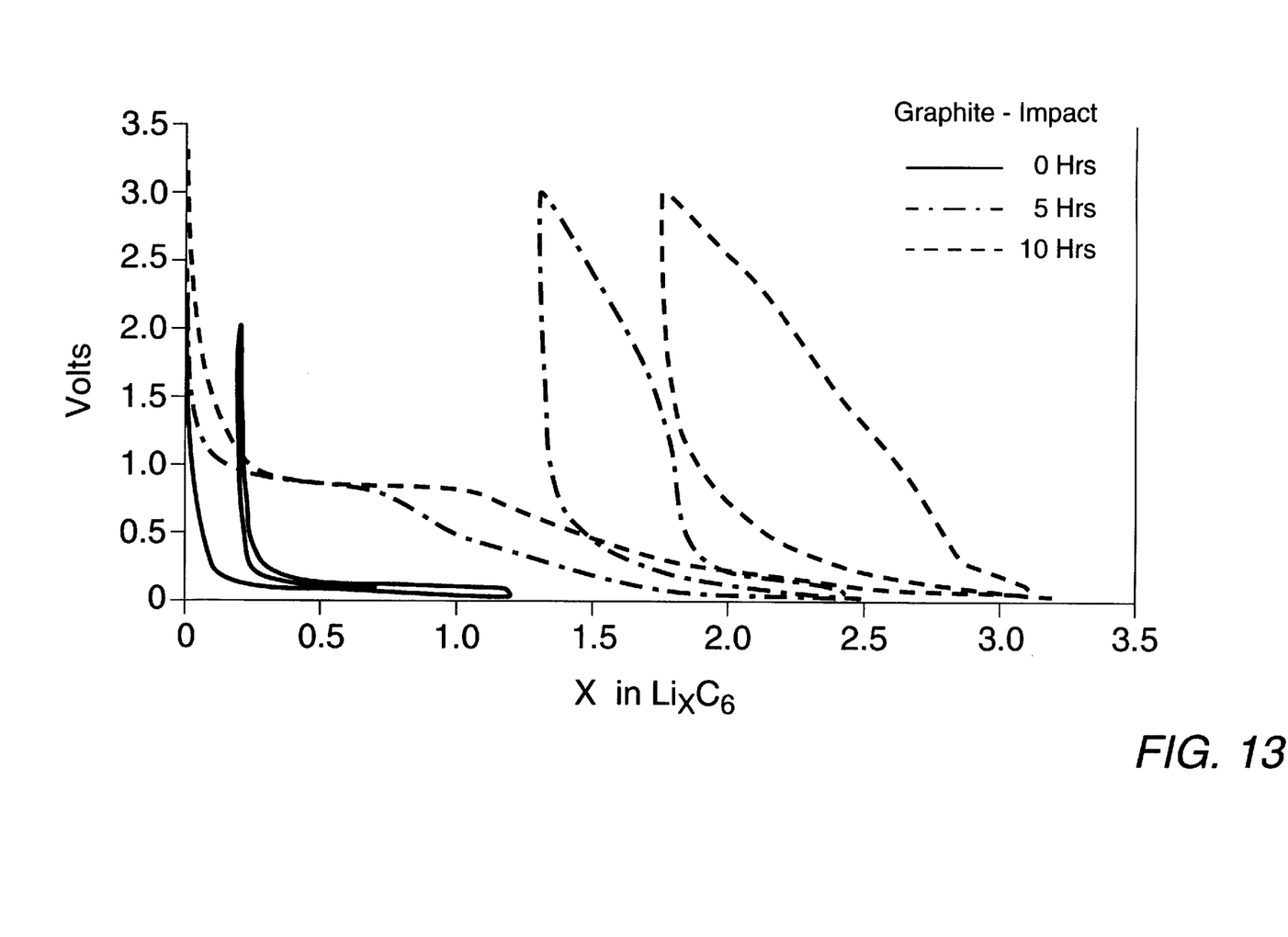
FIG. 13 is a graphic representation of the variations during initial discharge/charge cycling of Li intercalation composition in electrolytic cell carbon electrodes comprising graphite samples prepared by grinding under impact interactions for varying times.
Figure 14:
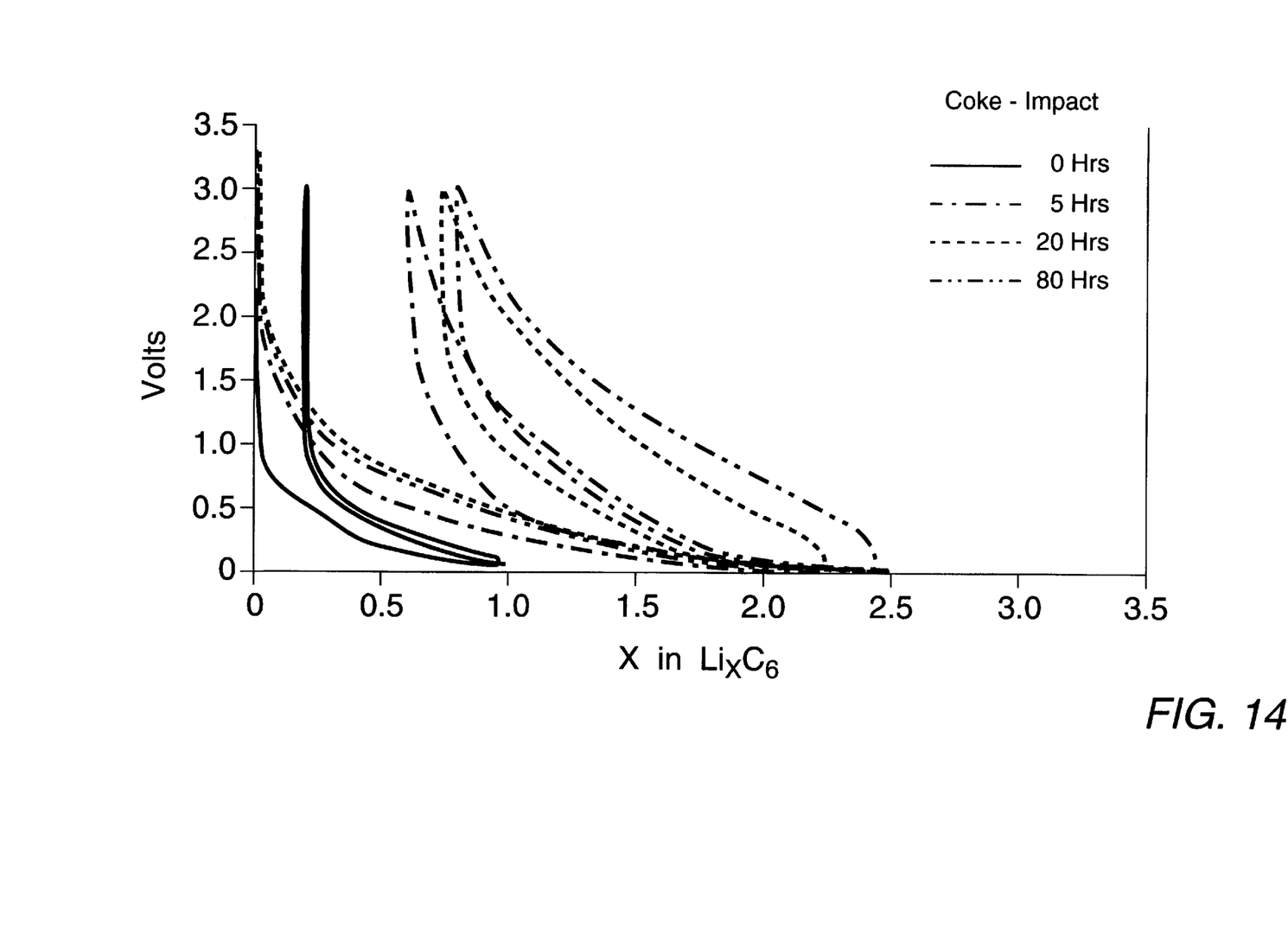
FIG. 14 is a graphic representation of the variations during initial discharge/charge cycling of Li intercalation composition in electrolytic cell carbon electrodes comprising coke samples prepared by grinding under impact interactions for varying times.
Figure 15:
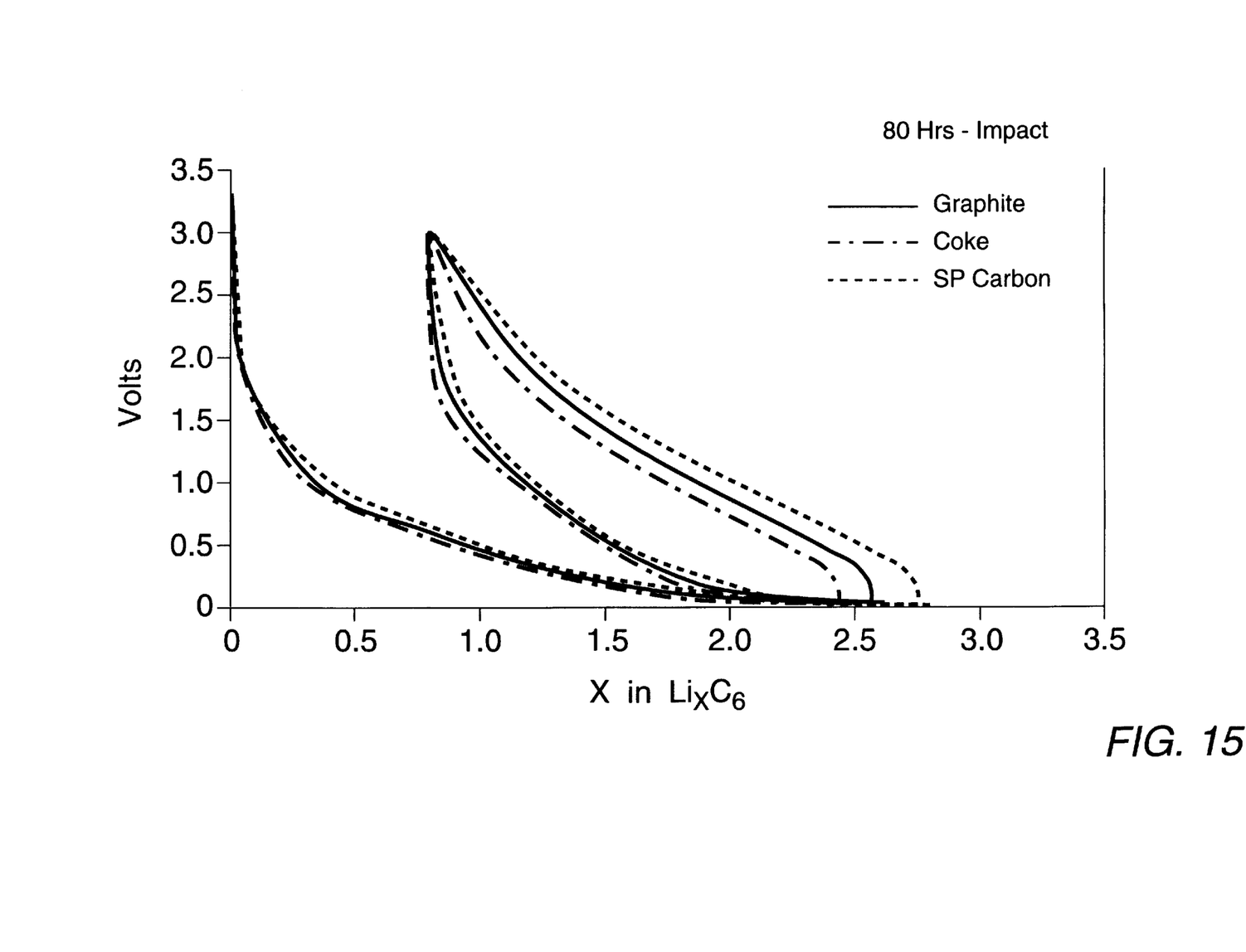
FIG. 15 is a graphic representation of the variations during initial discharge/charge cycling of Li intercalation composition in electrolytic cell carbon electrodes comprising graphite, coke, and SP carbon samples prepared by grinding under impact interactions for about 80 hours.

Electrochemical measurements of the cells were carried out using a "Mac Pile" cycling system from Bio-Logic of Claix, France. Operating in the galvanostatic mode, this system logged cell output voltage whenever it changed by more than 0.002 V and calculated from elapsed time and constant current, with ±1% current stability, the amount of intercalated Li species, x, in $Li_xC_6$, thus providing a measurement of the charge capacity of the carbon powder sample. Graphic representations of data acquired in a number of such tests appear in FIGS. 13–15. From such voltage profile curves the reversible capacity ($\Delta x_{rev}$) and the irreversible capacity ($\Delta x_{irrev}$) of electrodes comprising the various carbon samples were calculated and plotted together with the specific surface BET area of the samples as a function of the grinding time, as in FIGS. 5 through 12.

Figure 3:
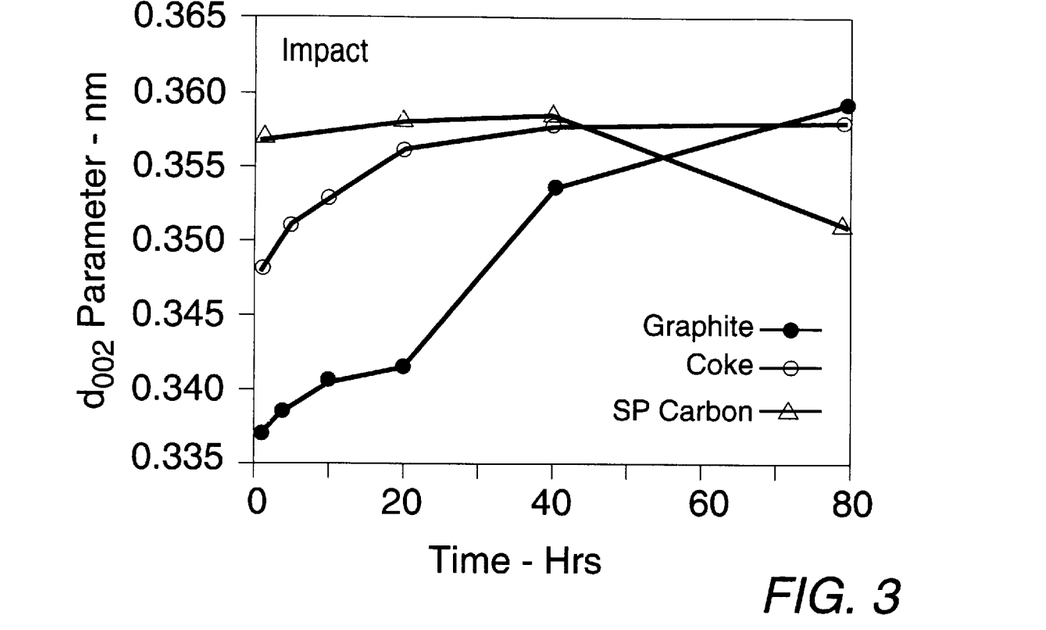
FIG. 3 is a graphic comparison of the $d_{002}$ lattice parameter measurements of representative samples of graphite, coke, and SP carbon after grinding under impact interactions over a period of about 80 hours.
Figure 4:
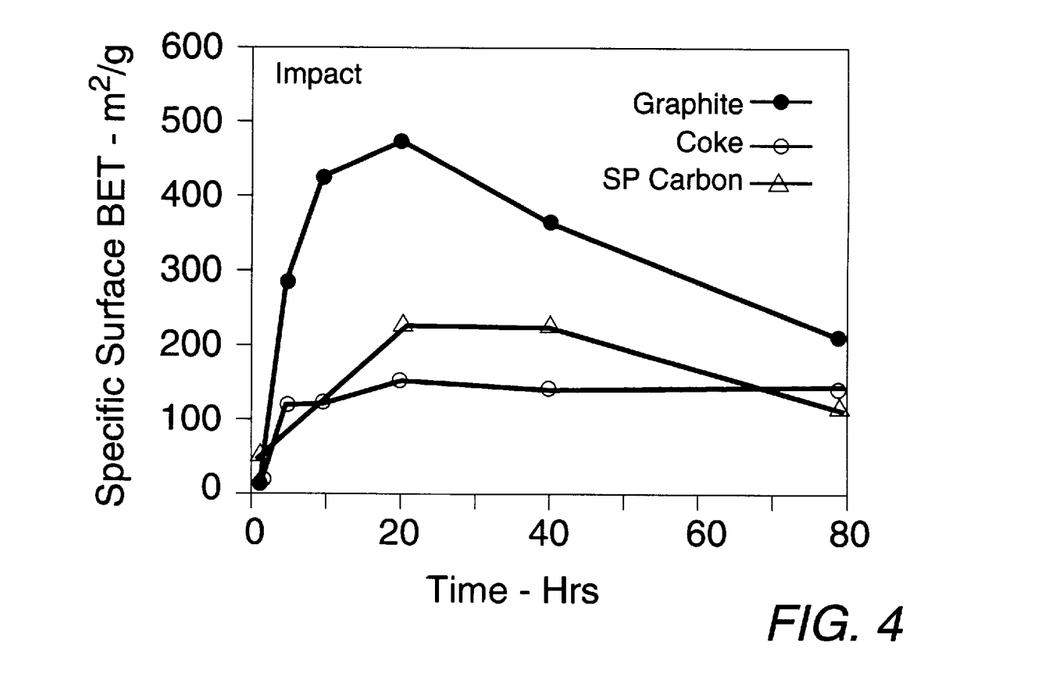
FIG. 4 is a graphic comparison of the specific surface BET measurements of representative samples of graphite, coke, and SP carbon after grinding under impact interactions over a period of about 80 hours.
Figure 5:
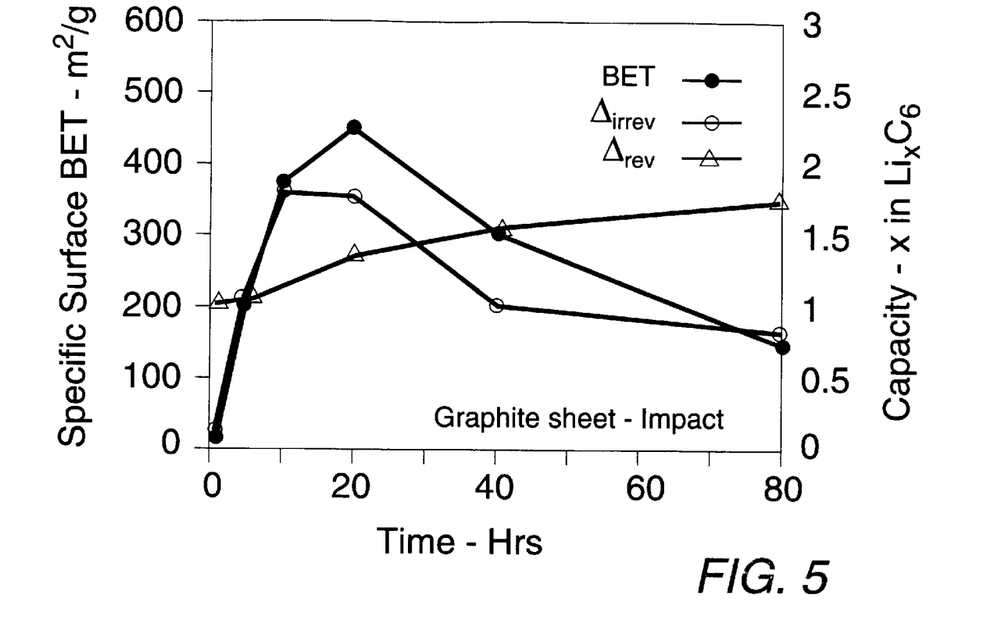
FIG. 5 is a graphic comparison of specific surface BET measurements of samples of a sheet graphite after grinding under impact interactions over a period of about 80 hours with irreversible and reversible capacity of electrolytic cells comprising electrodes incorporating such samples.
Figure 6:
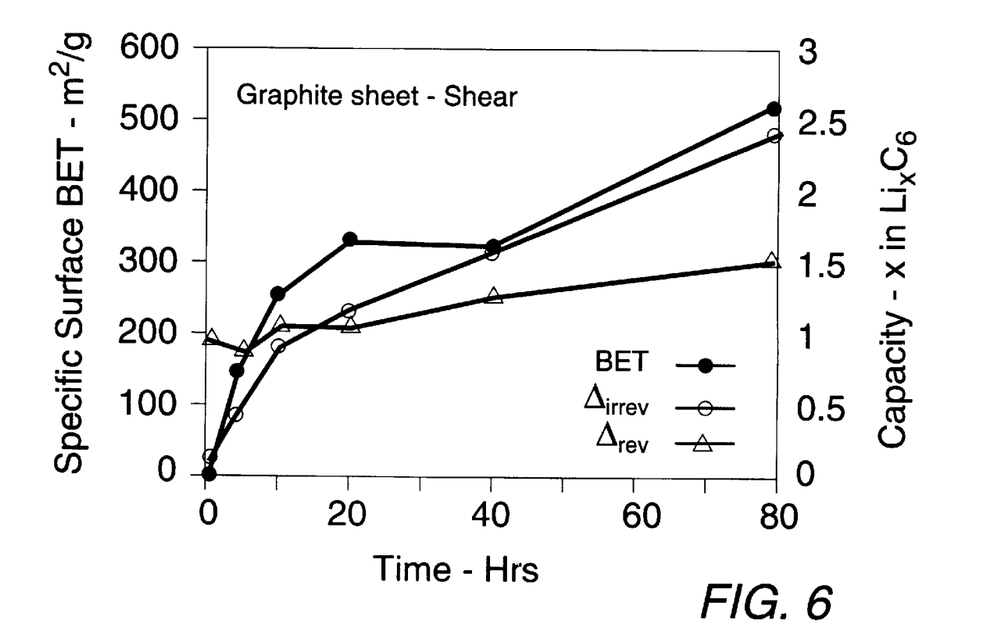
FIG. 6 is a graphic comparison of specific surface BET measurements of samples of a sheet graphite after grinding under shear interactions over a period of about 80 hours with irreversible and reversible capacity of electrolytic cells comprising electrodes incorporating such samples.
Figure 7:
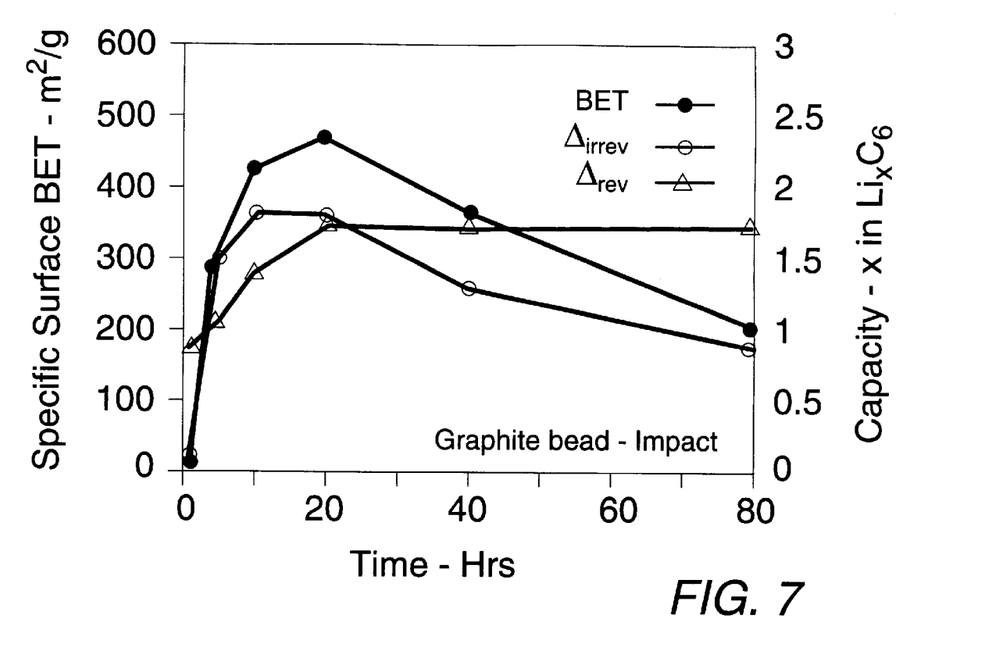
FIG. 7 is a graphic comparison of specific surface BET measurements of samples of a bead graphite after grinding under impact interactions over a period of about 80 hours with irreversible and reversible capacity of electrolytic cells comprising electrodes incorporating such samples.
Figure 8:
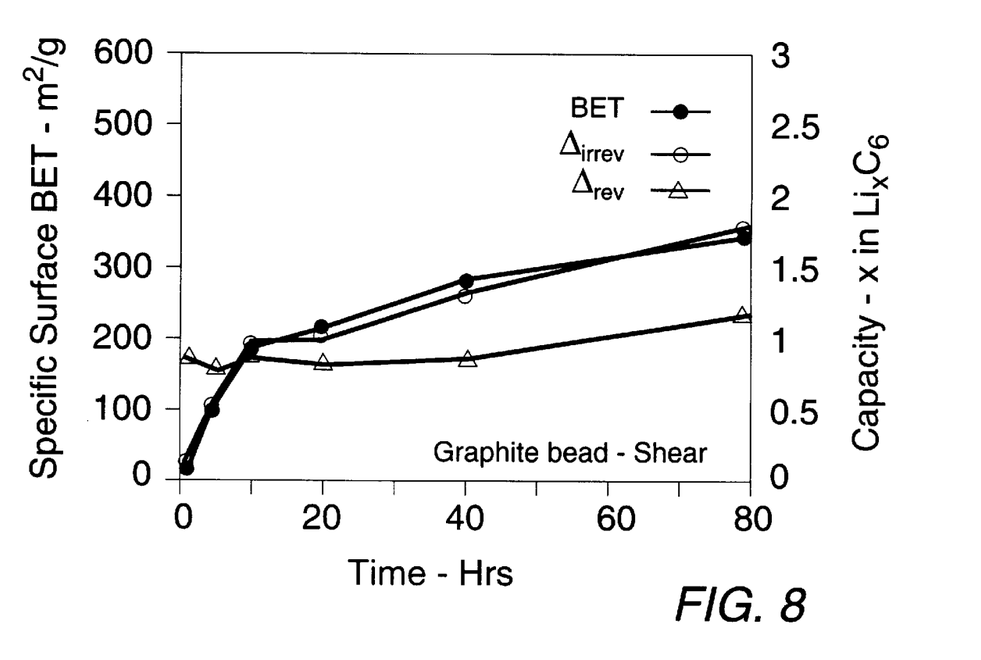
FIG. 8 is a graphic comparison of specific surface BET measurements of samples of a bead graphite after grinding under shear interactions over a period of about 80 hours with irreversible and reversible capacity of electrolytic cells comprising electrodes incorporating such samples.
Figure 9:
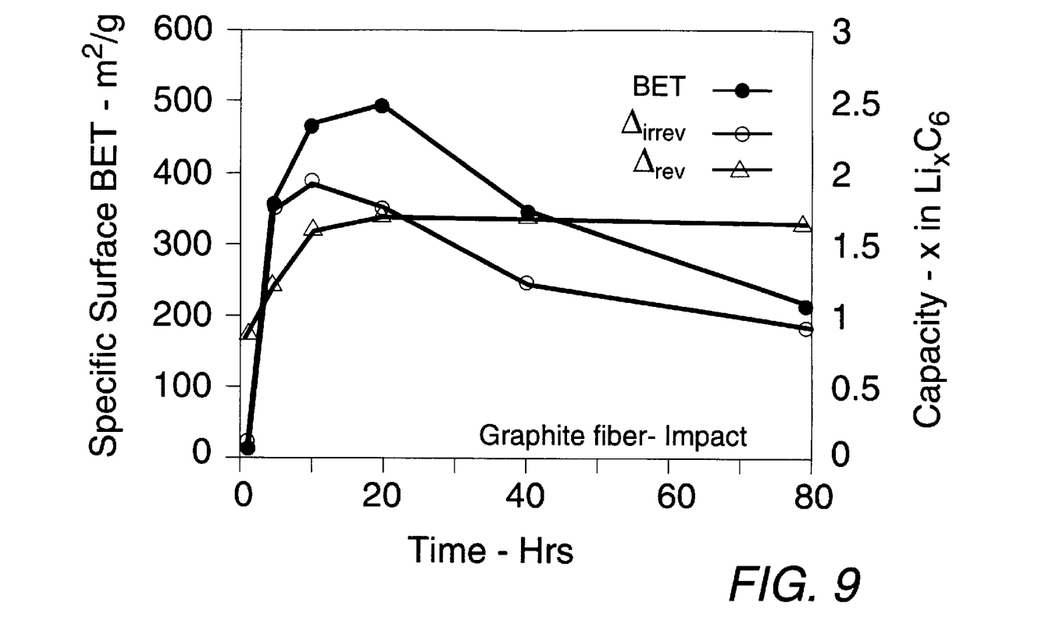
FIG. 9 is a graphic comparison of specific surface BET measurements of samples of a fiber graphite after grinding under impact interactions over a period of about 80 hours with irreversible and reversible capacity of electrolytic cells comprising electrodes incorporating such samples.
Figure 10:
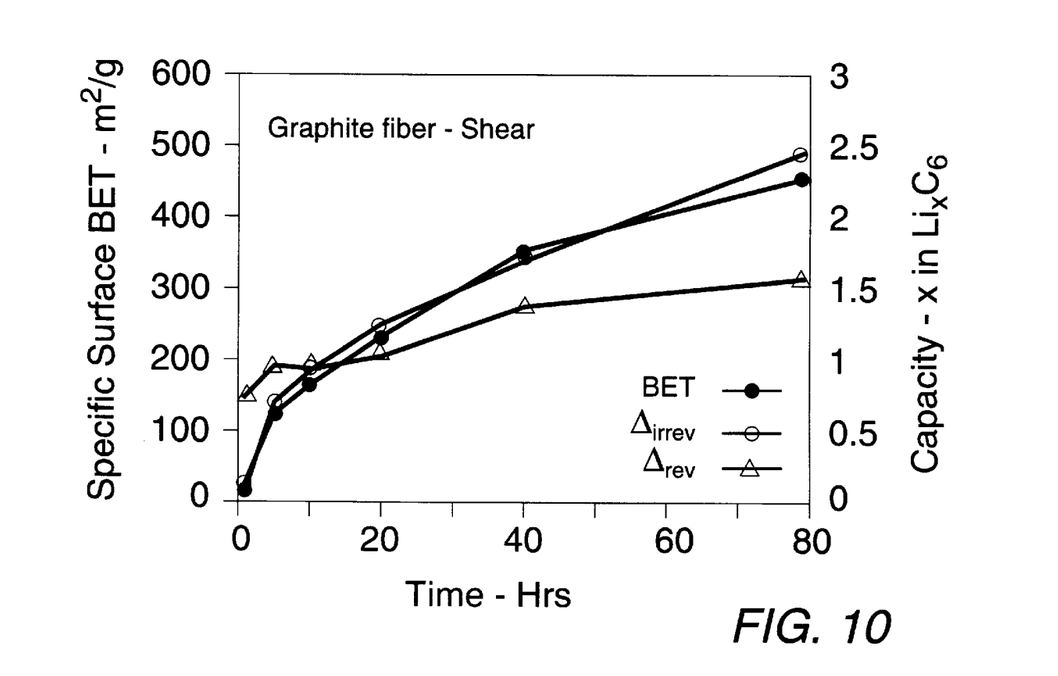
FIG. 10 is a graphic comparison of specific surface BET measurements of samples of a fiber graphite after grinding under shear interactions over a period of about 80 hours with irreversible and reversible capacity of electrolytic cells comprising electrodes incorporating such samples.
Figure 11:
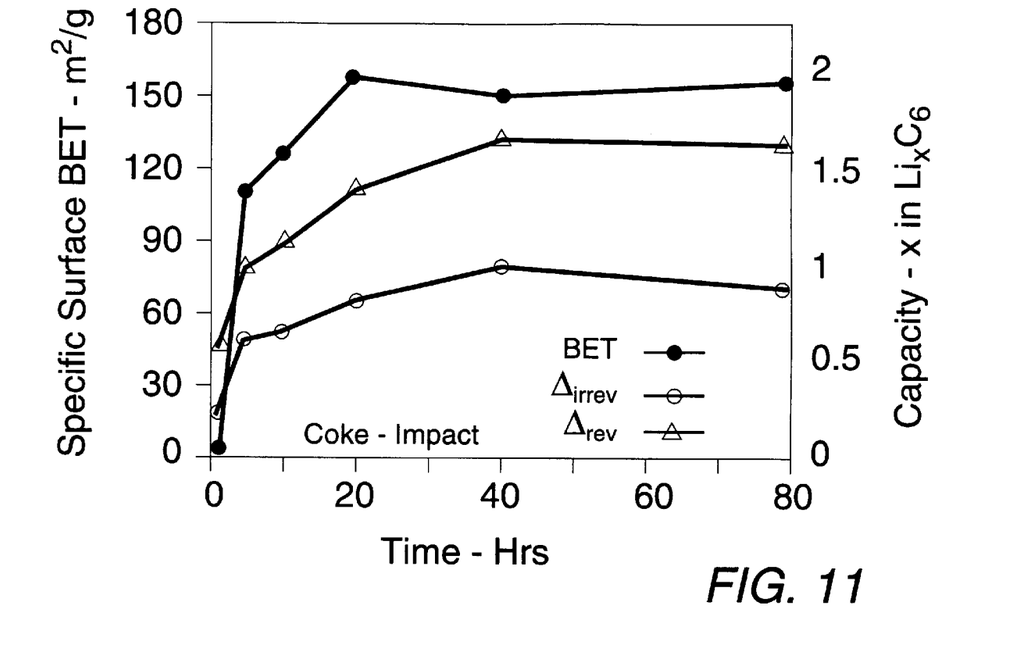
FIG. 11 is a graphic comparison of specific surface BET measurements of samples of a soft carbon coke after grinding under impact interactions over a period of about 80 hours with irreversible and reversible capacity of electrolytic cells comprising electrodes incorporating such samples.
Figure 12:
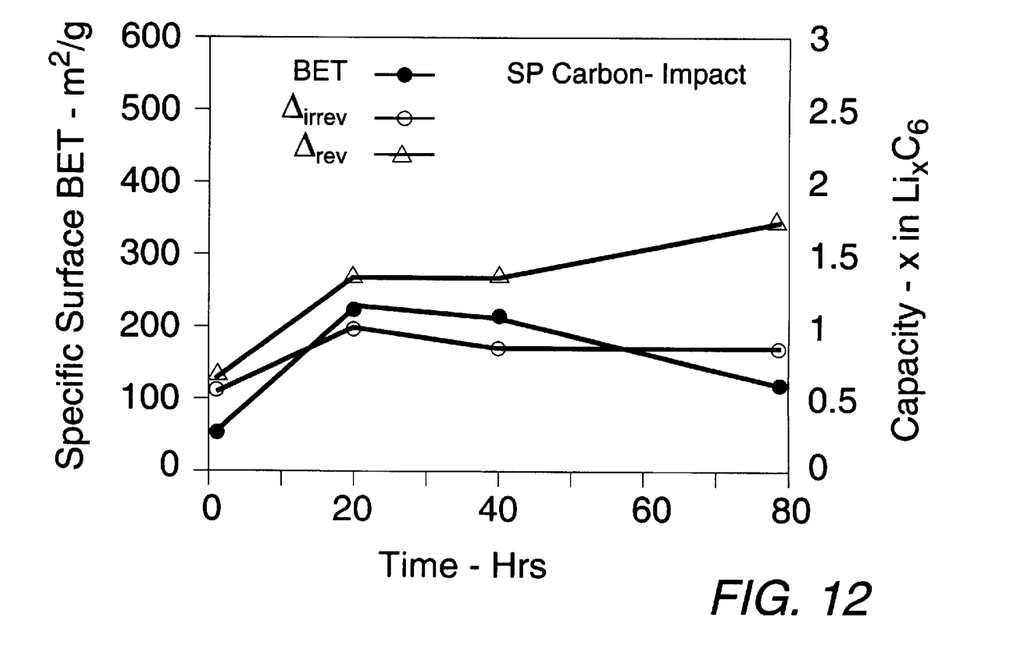
FIG. 12 is a graphic comparison of specific surface BET measurements of samples of an SP hard carbon after grinding under impact interactions over a period of about 80 hours with irreversible and reversible capacity of electrolytic cells comprising electrodes incorporating such samples.

These data confirm the earlier-noted expectation that irreversible capacity loss could be a function of BET surface area, since the measured irreversible loss tracks exceptionally well the measured BET surface area for all the carbon samples, independently of the type of grinding system used. Such a correlation is particularly striking for the impact-ground graphite samples where both irreversible loss and BET surface reach maxima simultaneously. Also for such samples another correlation occurs between surface area and structural parameters, namely, that when the BET surface area goes through such a maximum, the $d_{002}$ lattice spacing increases rapidly, as seen in FIGS. 2 and 3. Thus, it was additionally noted that advantageously the $\Delta x_{rev}$, in contrast to the $\Delta x_{irrev}$, increases with grinding time independently of the BET surface area.

A significant accomplishment of the present invention is that by mechanical grinding of carbons, whether graphite, soft carbon coke, or hard carbon, one can obtain materials which may be incorporated into electrolytic cell electrodes capable of intercalating lithium at an average voltage of 1 V vs. Li with as little as a 35% irreversible loss during the first discharge, yet able to sustain a reversible capacity approaching 2 Li per 6 carbons upon subsequent cycling. On the other hand, the reversible lithium capacity ($\Delta x_{rev}$), in contrast to the irreversible capacity ($x_{irrev}$), shows little direct correlation with the BET surface area, and will regularly increase with grinding time independently of the surface area variation. Thus, by mechanical grinding according to the present invention, one is able to increase the disorder, i.e., the number of single carbon layers, in electrode carbons and thereby increase the capacity of these materials to reversibly accept larger quantities of lithium ions. The generally disadvantageous irreversible loss of capacity may at the same time be limited by preferred impact grinding which, through the development of fine-particle agglomeration, reduces the specific surface BET area upon which that irreversible capacity apparently depends.

What is claimed is:

1. A rechargeable lithium battery cell comprising:
   a positive electrode element;
   a negative electrode element; and
   a separator element disposed between said positive electrode element and said negative electrode element;
   wherein at least one of said positive electrode element or negative electrode element comprises a carbon composition capable of intercalating lithium ions;

wherein said carbon composition comprises a carbon powder distributed throughout a polymeric binder matrix;

wherein said carbon powder is made by subjecting a particulate mass of a carbon material to an impact comminuting operation for at least 20 hours such that said carbon powder has an interlayer spacing, $d_{002}$, greater than 0.35 nm and a specific surface BET area less than 200 m$^2$/g; and wherein said battery cell has an intercalation capacity capable of reversibly intercalating about two lithiums per six carbons.

2. A cell according to claim 1, wherein said carbon material is selected from the class consisting of graphite, soft carbon coke, and SP hard carbon.

3. A cell according to claim 1, wherein said impact comminuting operation lasts for 20 to 80 hours.

4. A method of preparing a carbon composition for use in a rechargeable lithium battery cell having an intercalation capacity approximating $Li_2C_6$, said cell comprising:

a positive electrode element;

a negative electrode element; and a separator element disposed between said positive electrode element and said negative electrode element;

wherein at least one of said positive electrode element and said negative electrode element comprises said carbon composition which is capable of intercalating lithium ions;

said method comprising the steps of:

providing a particulate mass of carbon material;

subjecting said carbon material to an impact comminuting operation for at least 20 hours to obtain a carbon powder having an interlayer spacing, $d_{002}$, greater than 0.35 nm and a specific surface BET area less than 200 m$^2$/g; and distributing said carbon powder throughout a polymeric binder matrix to form said carbon composition.

5. A method according to claim 4, wherein said carbon material is selected from the class consisting of graphite, soft carbon coke, and SP hard carbon.

6. A method according to claim 4, wherein said step of subjecting said carbon material to an impact comminuting operation lasts for 20 to 80 hours.

7. A carbon powder having an interlayer spacing, $d_{002}$, greater than 0.35 nm and a specific surface BET area less than 200 m$^2$/g, wherein said carbon powder is made by subjecting a particulate mass of a carbon material to an impact comminuting operation for at least 20 hours.

8. A powder according to claim 7, wherein said carbon material is selected from the class consisting of graphite, soft carbon coke, and SP hard carbon.

9. A powder according to claim 7, wherein said impact comminuting operation lasts for 20 to 80 hours.

10. A rechargeable lithium battery cell comprising:

a positive electrode element;

a negative electrode element; and a separator element disposed between said positive electrode element and said negative electrode element;

wherein at least one of said positive electrode element or negative electrode element comprises a carbon composition capable of intercalating lithium ions;

wherein said carbon composition comprises a carbon powder distributed throughout a polymeric binder matrix;

wherein said carbon powder is made by subjecting a particulate mass of a carbon material to an impact comminuting operation for at least 20 hours such that said carbon powder has an interlayer spacing, $d_{002}$, greater than 0.35 nm and a specific surface BET area less than 200 m$^2$/g; and wherein said battery cell has a reversible capacity of 655 to 708 mAh/g and an irreversible capacity of 316 to 328 mAh/g.

* * * * *